United States Patent
Kobayashi et al.

(10) Patent No.: US 7,537,350 B2
(45) Date of Patent: May 26, 2009

(54) IMAGE PROCESSING SYSTEM, PROJECTOR, PROGRAM, INFORMATION STORAGE MEDIUM, AND IMAGE PROCESSING METHOD

(75) Inventors: Masanobu Kobayashi, Shiojiri (JP); Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 917 days.

(21) Appl. No.: 11/050,710

(22) Filed: Feb. 7, 2005

(65) Prior Publication Data

US 2005/0214662 A1 Sep. 29, 2005

(30) Foreign Application Priority Data

Mar. 29, 2004 (JP) .............................. 2004-095935

(51) Int. Cl.
G03B 21/14 (2006.01)

(52) U.S. Cl. ......................... 353/69; 353/70; 353/121

(58) Field of Classification Search .................... 353/69, 353/70, 121
See application file for complete search history.

(56) References Cited

U.S. PATENT DOCUMENTS

| 6,932,480 B2 * | 8/2005 | Wada et al. ................. 353/69 |
| 7,114,813 B2 * | 10/2006 | Wada et al. ................. 353/70 |
| 7,252,387 B2 * | 8/2007 | Raskar et al. ................. 353/69 |
| 2003/0210381 A1 * | 11/2003 | Itaki ............................ 353/70 |
| 2005/0024606 A1 | 2/2005 | Li et al. |
| 2006/0050243 A1 * | 3/2006 | Huewel ....................... 353/69 |
| 2007/0097328 A1 * | 5/2007 | Li et al. ....................... 353/70 |

FOREIGN PATENT DOCUMENTS

| JP | A 2002-044571 | 2/2002 |
| JP | A 2002-247614 | 8/2002 |
| JP | A 2004-040395 | 2/2004 |
| WO | WO 00/21282 A1 | 4/2000 |

OTHER PUBLICATIONS

Sukthankar et al., "Automatic Keystone Correction for Camera-Assisted Presentation Interfaces," Lecture Notes in Computer Science, XP-001148734, ISSN: 0302-9743, pp. 607-614 {Oct. 14, 2000}.

* cited by examiner

*Primary Examiner*—William C Dowling
(74) *Attorney, Agent, or Firm*—Oliff & Berridge, PLC (57) ABSTRACT

A projector including: an image projection section for projecting an image onto a rectangular screen through a liquid crystal panel; a position adjustment information generation section for generating position adjustment information based on position adjustment of the image made by a user; a correction information generation section for generating position correction information for correcting positions of four corners of the image on the screen based on the position adjustment information; and a correction section for correcting image information for projecting the image based on the position correction information.

8 Claims, 9 Drawing Sheets

$$\begin{pmatrix} x0 & y0 & 1 & 0 & 0 & 0 & -X0*x0 & -X0*y0 \\ 0 & 0 & 0 & x0 & y0 & 1 & -Y0*x0 & -Y0*y0 \\ x1 & y1 & 1 & 0 & 0 & 0 & -X1*x1 & -X1*y1 \\ 0 & 0 & 0 & x1 & y1 & 1 & -Y1*x1 & -Y1*y1 \\ x2 & y2 & 1 & 0 & 0 & 0 & -X2*x2 & -X2*y2 \\ 0 & 0 & 0 & x2 & y2 & 1 & -Y2*x2 & -Y2*y2 \\ x3 & y3 & 1 & 0 & 0 & 0 & -X3*x3 & -X3*y3 \\ 0 & 0 & 0 & x3 & y3 & 1 & -Y3*x3 & -Y3*y3 \end{pmatrix} \begin{pmatrix} Pa \\ Pb \\ Pc \\ Pd \\ Pe \\ Pf \\ Pg \\ Ph \end{pmatrix} = \begin{pmatrix} X0 \\ Y0 \\ X1 \\ Y1 \\ X2 \\ Y2 \\ X3 \\ Y3 \end{pmatrix}$$

IMAGE PROCESSING SYSTEM, PROJECTOR, PROGRAM, INFORMATION STORAGE MEDIUM, AND IMAGE PROCESSING METHOD

Japanese Patent Application No.2004-95935, filed on Mar. 29, 2004, is hereby incorporated by reference in its entirety.

BACKGROUND OF THE INVENTION

The present invention relates to an image processing system, a projector, a program, an information storage medium, and an image processing method capable of correcting the shape of an image.

There may be a case where an image is distorted depending on the relative angle formed by the optical axis of light projected from an image projection device such as a projector and a projection target such as a screen, whereby keystone distortion occurs in the vertical direction or the horizontal direction.

Therefore, an image display device must display an image in an undistorted state.

A conventional projector with an image correction function corrects only distortion of an image in the vertical direction using a built-in angle sensor, but cannot correct distortion of the image in the horizontal direction.

As a method for correcting distortion of an image in the horizontal direction, Japanese Patent Application Laid-open No. 2002-44571 proposes a method of allowing a user to indicate four corners of a screen using a mouse or the like and causing a projector to semi-automatically correct distortion of an image based on the indicated information.

Japanese Patent Application Laid-open No. 2002-247614 discloses a projector which determines the external shape of a screen using a sensing section and corrects an image so that the external shape of the image becomes the same as the determined external shape.

However, if a projector changes the shape of an image into the external shape of a screen as disclosed in Japanese Patent Applications Laid-open No. 2002-44571 and Japanese Patent Applications Laid-open No. 2002-247614, the image after being changed has an external shape differing from the external shape of the original image. In this case, since an observer has the impression that the displayed image differs from the original image, it is undesirable to employ such a processing method.

Moreover, it is desirable that an image be displayed at a desired aspect ratio even when using the height/width ratio of the projection target as a reference.

BRIEF SUMMARY OF THE INVENTION

According to a first aspect of the present invention, there is provided an image processing system, comprising:

image projection means for projecting an image onto a rectangular projection target through a projection panel;

position adjustment information generation means for generating position adjustment information based on position adjustment of the image made by a user;

correction information generation means for generating position correction information for correcting positions of four corners of the image on the projection target based on the position adjustment information; and correction means for correcting image information for projecting the image based on the position correction information, wherein the correction information generation means calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

According to a second aspect of the present invention, there is provided an image processing system, comprising:

an image projection section for projecting an image onto a rectangular projection target through a projection panel;

a position adjustment information generation section for generating position adjustment information based on position adjustment of the image made by a user;

a correction information generation section for generating position correction information for correcting positions of four corners of the image on the projection target based on the position adjustment information; and a correction section for correcting image information for projecting the image based on the position correction information, wherein the correction information generation section calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

According to a third aspect of the present invention, there is provided a projector comprising any of the above-described image processing systems.

According to a fourth aspect of the present invention, there is provided a computer-readable program causing a computer to function as:

image projection means for projecting an image onto a rectangular projection target through a projection panel;

position adjustment information generation means for generating position adjustment information based on position adjustment of the image made by a user;

correction information generation means for generating position correction information for correcting positions of four corners of the image on the projection target based on the position adjustment information; and correction means for correcting image information for projecting the image based on the position correction information, wherein the correction information generation means calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

According to a fifth aspect of the present invention, there is provided a computer-readable information storage medium storing the above-described program.

According to a sixth aspect of the present invention, there is provided an image processing method, comprising:

projecting an image onto a rectangular projection target through a projection panel;

generating position adjustment information based on position adjustment of the image made by a user;

calculating a height/width ratio of the projection target based on the position adjustment information in a state in which the four corners of the image coincide with four corners of the projection target by the position adjustment of the image made by the user;

generating position correction information for correcting positions of four corners of the image on the projection target, based on the height/width ratio so that the image is displayed at a predetermined aspect ratio;

correcting image information for projecting the image based on the position correction information; and projecting the image based on the corrected image information.

DETAILED DESCRIPTION OF THE EMBODIMENTS

The present invention has been achieved in view of the above-described problem. Embodiments of the present invention may provide an image processing system, a projector, a program, an information storage medium, and an image processing method capable of correcting distortion of an image so that the image is displayed at a desired aspect ratio.

According to one embodiment of the present invention, there are provided an image processing system and a projector, each of which comprises:

image projection means for projecting an image onto a rectangular projection target through a projection panel;

position adjustment information generation means for generating position adjustment information based on position adjustment of the image made by a user;

correction information generation means for generating position correction information for correcting positions of four corners of the image on the projection target based on the position adjustment information; and correction means for correcting image information for projecting the image based on the position correction information, wherein the correction information generation means calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

According to one embodiment of the present invention, there is provided a computer-readable program causing a computer to function as:

image projection means for projecting an image onto a rectangular projection target through a projection panel;

position adjustment information generation means for generating position adjustment information based on position adjustment of the image made by a user;

correction information generation means for generating position correction information for correcting positions of four corners of the image on the projection target based on the position adjustment information; and correction means for correcting image information for projecting the image based on the position correction information, wherein the correction information generation means calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

According to one embodiment of the present invention, there is provided a computer-readable information storage medium storing the above-described program.

According to one embodiment of the present invention, there is provided an image processing method, comprising:

projecting an image onto a rectangular projection target through a projection panel;

generating position adjustment information based on position adjustment of the image made by a user;

calculating a height/width ratio of the projection target based on the position adjustment information in a state in which the four corners of the image coincide with four corners of the projection target by the position adjustment of the image made by the user;

generating position correction information for correcting positions of four corners of the image on the projection target, based on the height/width ratio so that the image is displayed at a predetermined aspect ratio;

correcting image information for projecting the image based on the position correction information; and projecting the image based on the corrected image information.

The image processing system and others according to these embodiments can determine the height/width ratio of the projection target and the positions of the four corners of the image on the projection target based on the position adjustment information in a state in which the four corners of the image coincide with the four corners of the projection target. The image processing system and the like can correct distortion of an image so that the image is displayed at a desired aspect ratio by using the above information.

In each of the image processing system, the projector, the program and the information storage medium, the correction information generation means may generate depth position information indicating a depth position for setting a virtual projection plane based on angle-of-view information indicating a horizontal or vertical angle of view of a projection lens in the image projection means and based on horizontal resolution or vertical resolution of the projection panel;

the correction information generation means may set a three-dimensional space in which an optical axis of the lens having a principal point of the lens as an origin is added to a two-dimensional plane of the projection panel as a third dimension;

the correction information generation means may generate first three-dimensional position information indicating a position of the projection target in a state in which the projection target is perspectively projected onto the virtual projection plane in the three-dimensional space, based on the depth position information and first two-dimensional position information which indicates a position of the projection target on the two-dimensional plane based on the position adjustment information; and the correction information generation means may calculate the height/width ratio based on the first three-dimensional position information by utilizing a condition in which two opposite sides of the projection target are equal in length and are parallel.

The image processing method may further comprise:

generating depth position information indicating a depth position for setting a virtual projection plane based on angle-of-view information indicating a horizontal or vertical angle of view of a projection lens and based on horizontal resolution or vertical resolution of the projection panel;

setting a three-dimensional space in which an optical axis of the lens having a principal point of the lens as an origin is added to a two-dimensional plane of the projection panel as a third dimension;

generating first three-dimensional position information indicating a position of the projection target in a state in which the projection target is perspectively projected onto the virtual projection plane in the three-dimensional space, based on the depth position information and first two-dimensional position information which indicates a position of the projection target on the two-dimensional plane based on the position adjustment information; and calculating the height/width ratio based on the first three-dimensional position information by utilizing a condition in which two opposite sides of the projection target are equal in length and are parallel.

The image processing system and others can correct distortion of an image so that the image is displayed at a desired aspect ratio corresponding to the horizontal or vertical angle of view of the projection lens even when projecting the image while increasing or reducing the size of the image.

In each of the image processing system, the projector, the program and the information storage medium, the correction information generation means may generate second three-dimensional position information indicating a position of the image after correction in the three-dimensional space based on the first three-dimensional position information, the height/width ratio, and the aspect ratio;

the correction information generation means may generate second two-dimensional position information indicating a position of the image after correction in a state in which the image is perspectively projected onto the virtual projection plane, based on the second three-dimensional position information; and the correction information generation means may generate the position correction information based on the second two-dimensional position information.

The image processing method may further comprise:

generating second three-dimensional position information indicating a position of the image after correction in the three-dimensional space based on the first three-dimensional position information, the height/width ratio, and the aspect ratio;

generating second two-dimensional position information indicating a position of the image after correction in a state in which the image is perspectively projected onto the virtual projection plane, based on the second three-dimensional position information; and generating the position correction information based on the second two-dimensional position information.

The image processing system and others can correct distortion of an image so that the image is displayed at a desired aspect ratio by specifying the positions of the four corners of the projection target in the three-dimensional space and utilizing the condition in which the opposite sides of the projection target are equal in length and are parallel.

These embodiments of the present invention will be described below with reference to the drawings taking the case of applying the present invention to a projector which corrects the shape of an image as an example. Note that the embodiments described below do not in any way limit the scope of the invention laid out in the claims herein. In addition, not all of the elements of the embodiments described below should be taken as essential requirements of the present invention.

Entire System

Figure 1:
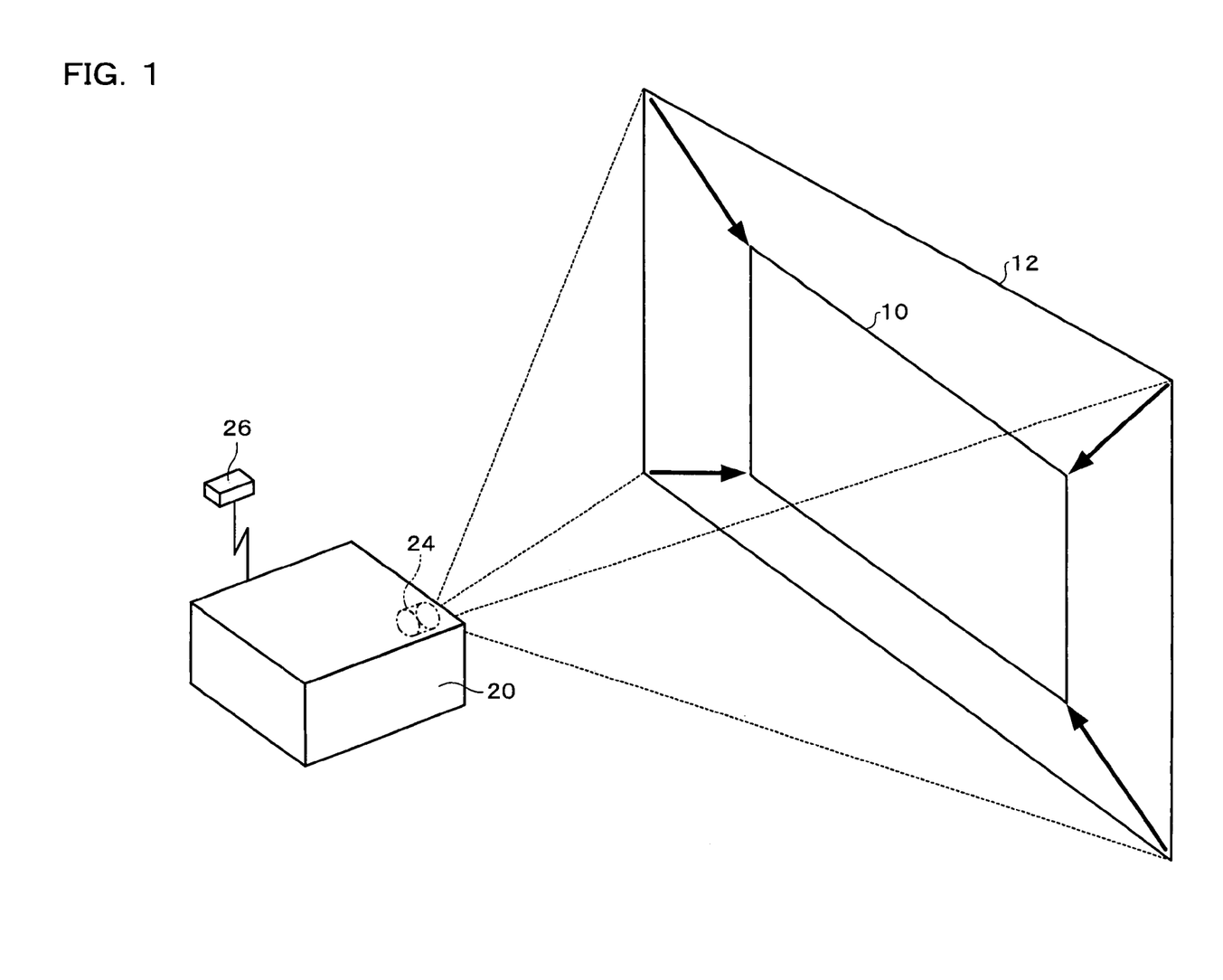
FIG. 1 is a schematic diagram showing a state when projecting an image.

FIG. 1 is a schematic diagram showing a state when projecting an image.

A projector 20, which is one type of an image processing system, projects an image from a lens unit 24 onto a screen 10, which is one type of a projection target. In this embodiment, the projector 20 is not disposed perpendicularly to the screen 10. Therefore, the shape of a projected image 12 is distorted in the shape of a trapezoid.

In this embodiment, in order to correct such an image distortion, the projector 20 is formed to allow the user to adjust the projected image 12 using a remote controller 26 so that the four corners of the projected image 12 coincide with the four corners of the screen 10. This function is included in a projector currently on the market. As specific examples of such a function, "Quick Corner" included in a projector manufactured by Seiko Epson Corporation and the like can be given.

However, in the case where the shape of the screen 10 does not have a desired height/width ratio, the projected image 12 is not displayed at a desired aspect ratio merely by causing the four corners of the projected image 12 to coincide with the four corners of the screen 10, whereby the user may have the impression that the displayed image differs from the original image.

Therefore, in this embodiment, the height/width ratio of the screen 10 is determined based on operation information from the remote controller 26, and image information is corrected so that the projected image 12 is displayed at a desired aspect ratio.

Functional blocks of the projector 20 for implementing such a function are described below.

Figure 2:
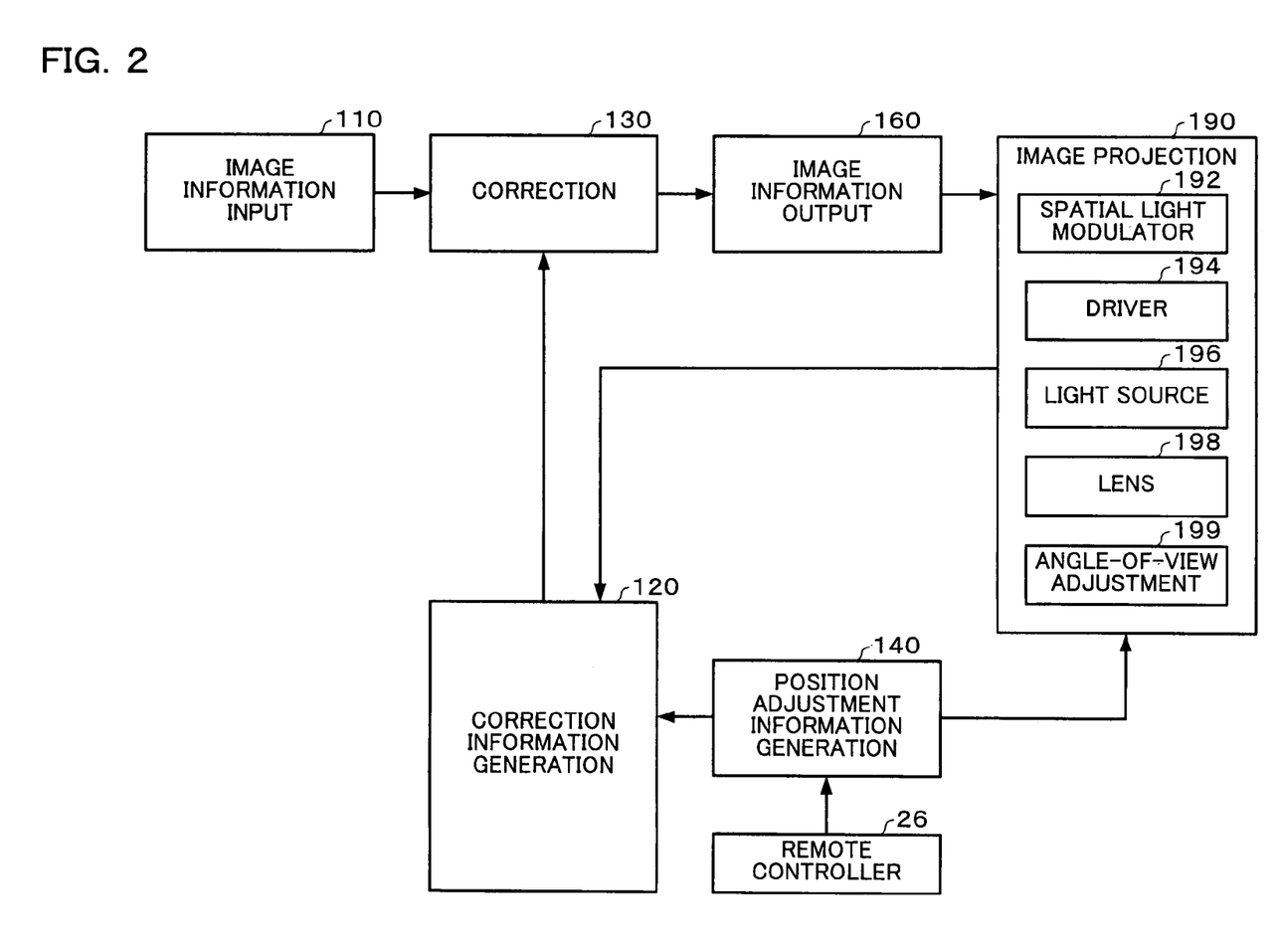
FIG. 2 is a functional block diagram of a projector according to one embodiment of the present invention.

FIG. 2 is a functional block diagram of the projector 20 according to one embodiment of the present invention.

The projector 20 is configured to include an image information input section 110 which inputs image information (RGB signals, for example), a correction section 130 which corrects the input image information so that distortion of an image is corrected, an image information output section 160 which outputs the corrected image information, and an image projection section 190 which projects an image based on the image information.

The projector 20 is configured to include a position adjustment information generation section 140 which generates position adjustment information based on the operation information from the remote controller 26, and a correction information generation section 120 which generates position correction information for correcting the positions of the four corners of the projected image 12 on the screen 10 based on the position adjustment information.

The image projection section 190 is configured to include a spatial light modulator 192 including a liquid crystal panel, a driver section 194 which drives the spatial light modulator 192, a light source 196, a lens 198 included in the lens unit 24, and an angle-of-view adjustment section 199.

The driver section 194 drives the spatial light modulator 192 based on the image information from the image information output section 160. The image projection section 190 projects light from the light source 196 through the spatial light modulator 192 and the lens 198.

Figure 3:
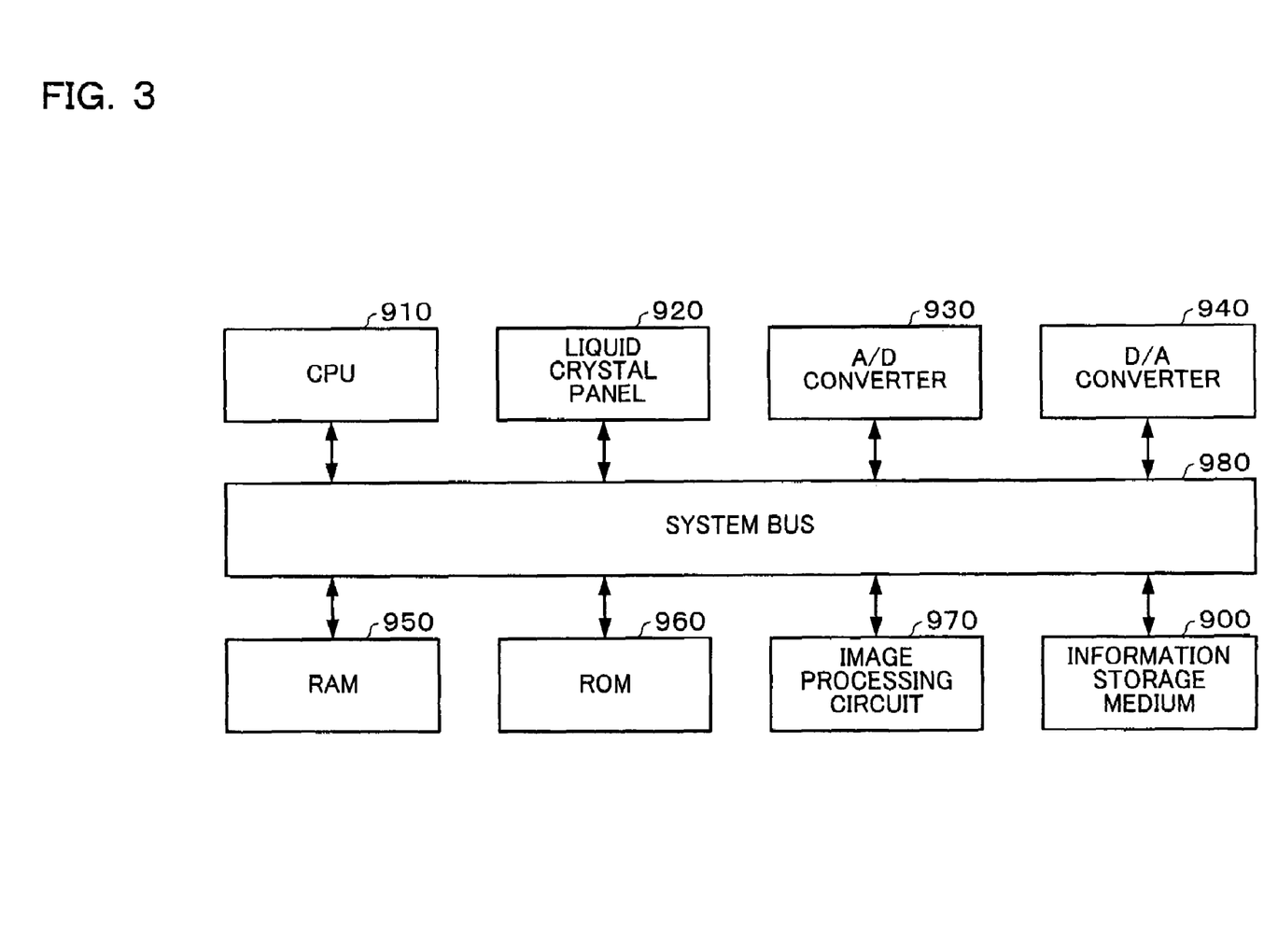
FIG. 3 is a hardware block diagram of a projector according to one embodiment of the present invention.

As hardware for implementing each section of the projector 20, the following hardware may be applied, for example.

FIG. 3 is a hardware block diagram of the projector 20 according to one embodiment of the present invention.

For example, the image information input section 110 may be implemented using an A/D converter 930 and the like, the correction section 130 may be implemented using an image processing circuit 970, a RAM 950, a CPU 910, and the like, the image information output section 160 may be implemented using a D/A converter 940 and the like, the correction information generation section 120 and the position adjustment information generation section 140 may be implemented using an image processing circuit 970, the RAM 950, and the like, and the spatial light modulator 192 may be implemented using a liquid crystal panel 920, a ROM 960 which stores a liquid crystal light valve driver which drives the liquid crystal panel 920, and the like.

These sections can exchange information through a system bus 980. Some or all of these sections may be implemented by hardware such as a circuit, or may be implemented by software such as a driver.

The function of the correction information generation section 120 or the like may be implemented by a computer which reads a program for causing the computer to function as the correction information generation section 120 or the like from an information storage medium 900 which stores the program.

As the information storage medium 900, a CD-ROM, DVD-ROM, ROM, RAM, HDD, or the like may be applied. A program read method may be either a contact method or a noncontact method.

Each of the above-described functions may be implemented by downloading a program or the like for implementing each of the above-described functions from a host device or the like through a transmission line instead of using the information storage medium 900.

Flow of Image Processing

A flow of image processing using these sections is described below.

Figure 4:
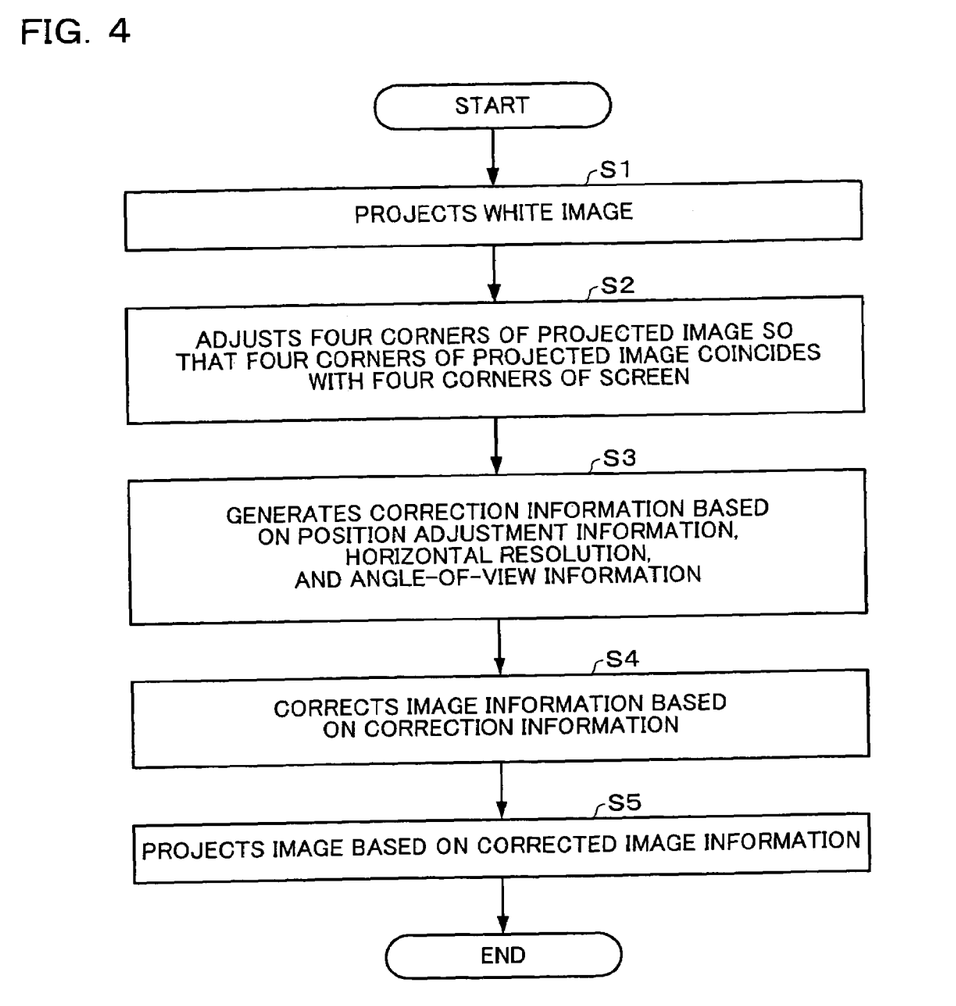
FIG. 4 is a flowchart showing a flow of image processing according to one embodiment of the present invention.

FIG. 4 is a flowchart showing a flow of image processing according to one embodiment of the present invention.

The user installs the projector 20 so that the outer frame of the projected image 12 is disposed outside the screen 10, as shown in FIG. 1. The user activates the projector 20 and projects a white image (step S1). As a result, the outer frame of the projected image 12 is displayed outside the screen 10.

The user adjusts the positions of the four corners of the projected image 12 using the remote controller 26 so that the four corners of the projected image 12 coincide with the four corners of the screen 10, as indicated by bold arrows shown in FIG. 1 (step S2). The position adjustment information generation section 140 generates the position adjustment information on each of the four corners based on the operation information from the remote controller 26.

The correction information generation section 120 acquires the position adjustment information from the position adjustment information generation section 140, a value indicating the horizontal angle of view of the liquid crystal panel 920 in the image projection section 190, and angle-of-view information indicating a horizontal angle of view OH of the lens 198 in a state in which the four corners of the projected image 12 coincide with the four corners of the screen 10.

Figure 5:
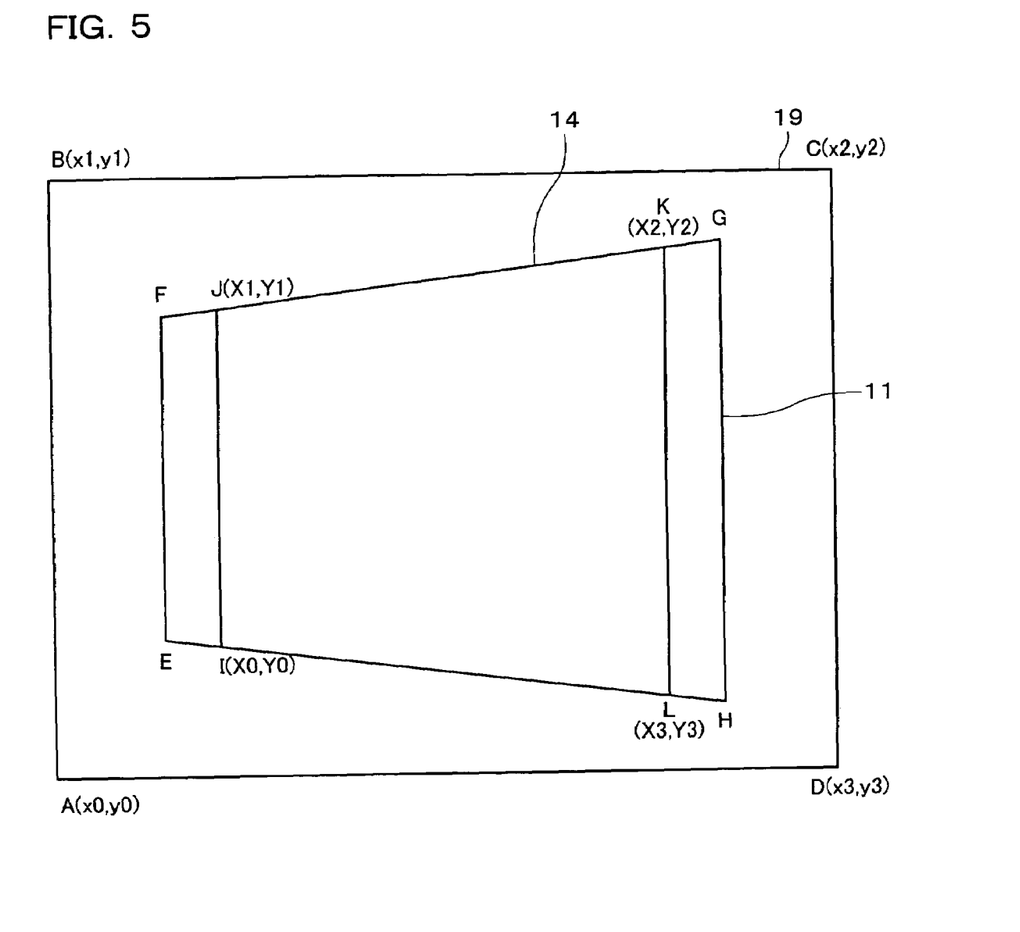
FIG. 5 is a schematic diagram showing a projection panel region according to one embodiment of the present invention.

FIG. 5 is a schematic diagram showing a projection panel region 19 according to one embodiment of the present invention.

For example, the two-dimensional plane of the liquid crystal panel 920 may be indicated as the projection panel region 19. For example, a projection target region 11 which is a region corresponding to the screen 10 is a region EFGH shown in FIG. 5, and a projection region before correction, which is a region corresponding to the projected image 12, is a region ABCD shown in FIG. 5 which coincides with the projection panel region 19.

The correction information generation section 120 generates the correction information based on the position adjustment information, the horizontal resolution of the liquid crystal panel 920, and the angle-of-view information (step S3).

In more detail, the correction information generation section 120 calculates a depth value Pz of the screen 10 at a virtual projection plane onto which the screen 10 is perspectively projected based on the known horizontal resolution of the liquid crystal panel 920 and the angle-of-view information. Based on first two-dimensional position information indicating the positions of the four corners of the projection target region 11 on the two-dimensional plane of the projection panel region 19 and depth position information indicating the depth value Pz, the correction information generation section 120 generates first three-dimensional position information indicating the positions of the four corners of the screen 10 when perspectively projected onto a virtual projection plane in a three-dimensional space in which the optical axis of the lens 198 having the principal point of the lens 198 as the origin is added to the two-dimensional plane as a third dimension.

Figure 6:
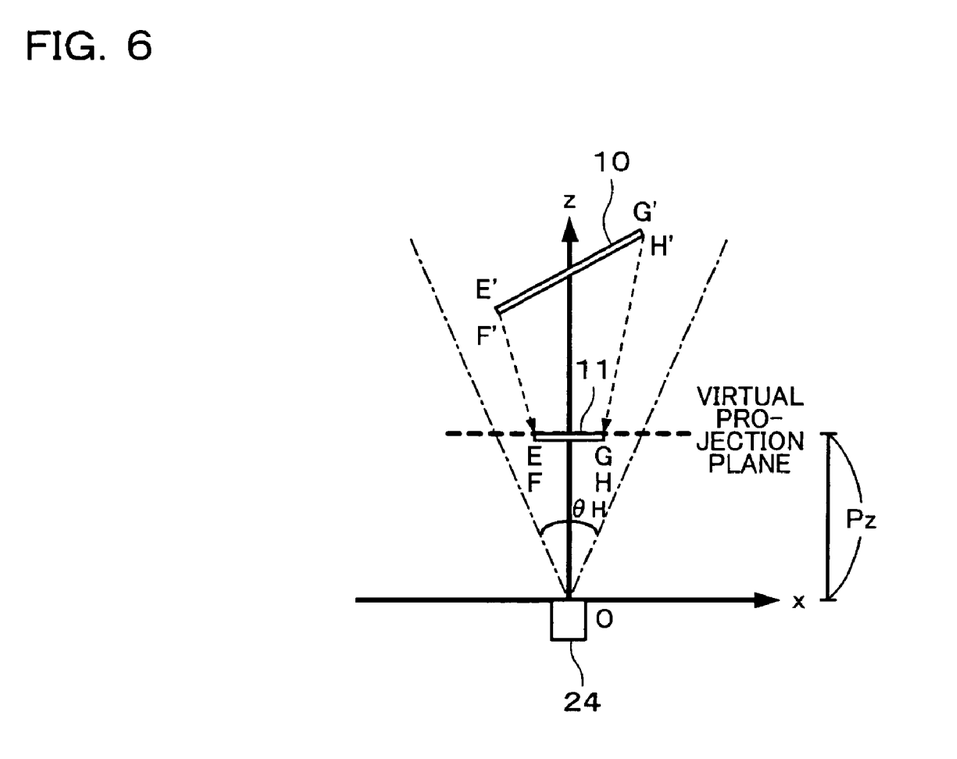
FIG. 6 is a schematic diagram showing a three-dimensional space and a depth value Pz according to one embodiment of the present invention.

FIG. 6 is a schematic diagram showing the three-dimensional space and the depth value Pz according to one embodiment of the present invention.

Suppose that the plane of the lens unit 24 (lens 198) is the xy two-dimensional plane and the optical axis of the lens 198 is the z axis, for example. In this case, a region E'F'G'H' of the screen 10 is the projection target region 11 on the virtual projection plane to which the projection panel region 19 corresponds. The distance from the origin to the virtual projection plane in the three-dimensional space is the depth value Pz.

In this case, the coordinates of the four corners of the projection target region 11 in the three-dimensional space may be expressed as $E(E_x, E_y, P_z)$, $F(F_x, F_y, P_z)$, $G(G_x, G_y, P_z)$, and $H(H_x, H_y, P_z)$. The actual coordinates of the four corners of the screen 10 may be expressed as $E'=s*E$, $F'=*F$, G'=u*G, and H'=v*H. Since the screen 10 is rectangular, two opposite sides are equal in length and are parallel. Specifically, the vectors E'F' and H'G' are equal. The correction information generation section 120 can uniquely determine the real numbers s, t, u, and v by assuming s=1 in addition to this condition.

The correction information generation section 120 calculates the height/width ratio (E'F'/F'G') of the screen 10.

The correction information generation section 120 compares the height/width ratio of the screen 10 with a desired aspect ratio Sa of the projected image 12, and calculates the coordinates of four corners IJKL of a projection region 14 after correction at which an appropriate aspect ratio is obtained.

Figure 7A:
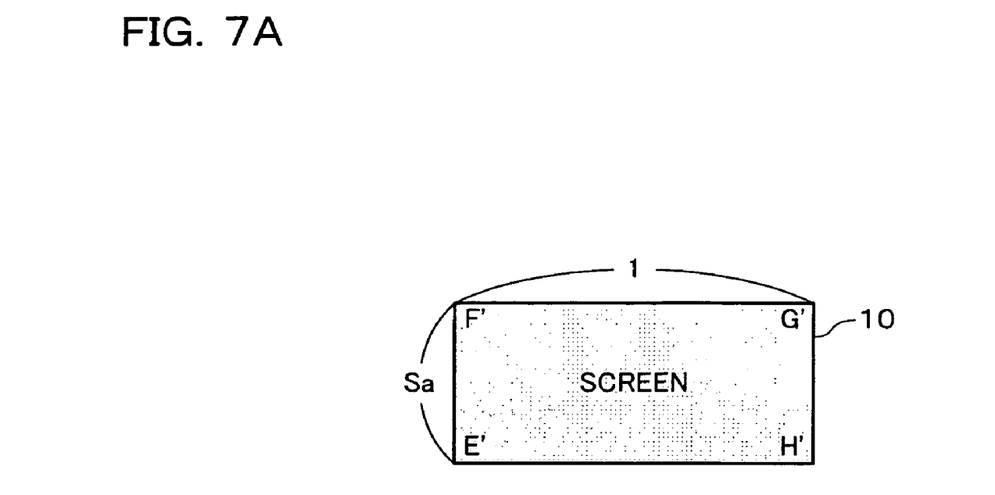
FIG. 7A shows a screen when the width is greater than the height.
Figure 7B:
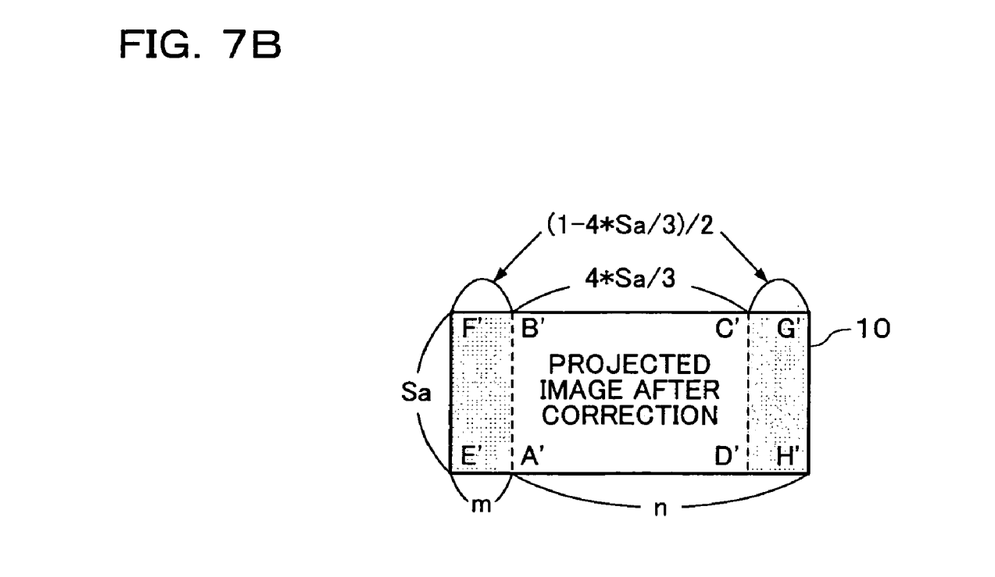
FIG. 7B shows a projection region after correction on the screen shown in FIG. 7A.
Figure 8A:
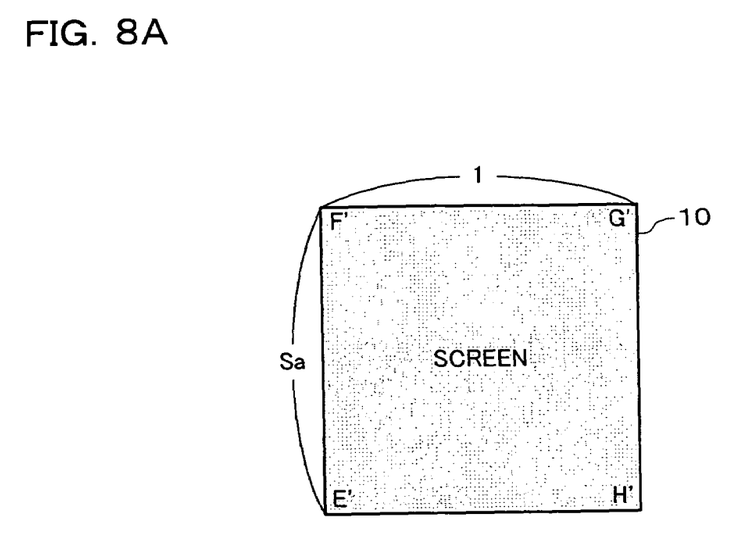
FIG. 8A shows a screen when the width is shorter than the height.
Figure 8B:
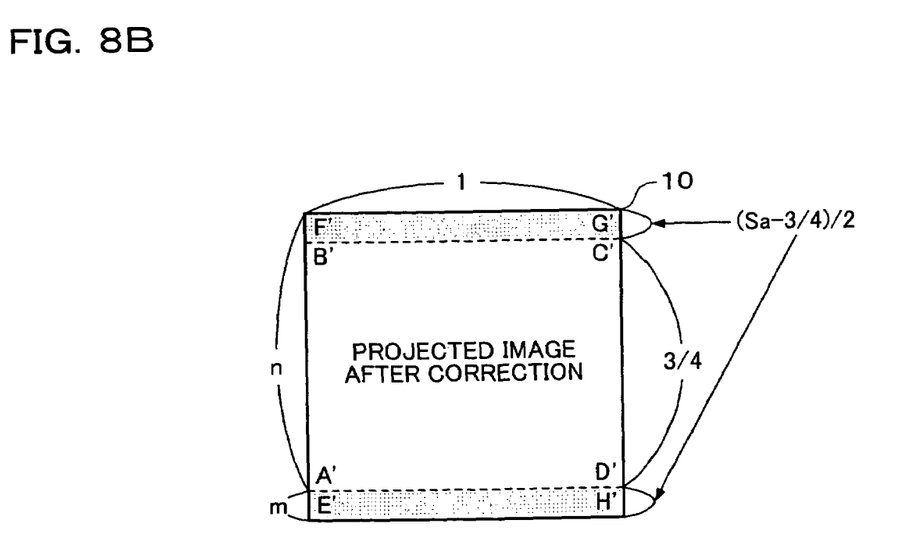
FIG. 8B shows a projection region after correction on the screen shown in FIG. 8A.

FIG. 7A shows the screen 10 when the width is greater than the height, and FIG. 7B shows the projected image 12 after correction on the screen 10 shown in FIG. 7A. FIG. 8A shows the screen 10 when the width is smaller than the height, and FIG. 8B shows the projected image 12 after correction on the screen 10 shown in FIG. 8A.

The following description is given on the assumption that the desired aspect ratio Sa is 0.75.

In the case where the height/width ratio of the screen 10 is approximately equal to 0.75 (may not necessarily be equal to 0.75 insofar as the aspect ratio is within the allowable range), the correction information generation section 120 generates the correction information so that the shape of the projected image 12 coincides with the shape of the screen 10. In this embodiment, the correction information generation section 120 generates the correction information so that the shape of the projected image 12 coincides with the shape of the screen 10 when the height/width ratio of the screen 10 is approximately equal to 0.75 for convenience of description.

As shown in FIG. 7A, when the height/width ratio is smaller than 0.75, specifically, when the screen 10 is oblong, the correction information generation section 120 generates the correction information so that the projected image 12 after correction (region A'B'C'D') is displayed in a region having an additional space on the right and left of the screen 10, as shown in FIG. 7B.

When the aspect ratio Sa is smaller than 0.75, since A' is the point which divides E'H' at a ratio of m:n, A' equals (n*E'+m*H')/(m+n). Suppose that m+n equals 1.

Since the ratio of the width to the height of the screen 10 is Sa:1, it is required that m equals (1−4*Sa/3)/2 and n equals 1−(1−4*Sa/3)/2 in order to maintain the aspect ratio of the projected image 12 after correction at 0.75.

The correction information generation section 120 calculates B', C', and D' in the same manner as A'.

As shown in FIG. 8A, when the height/width ratio is greater than 0.75, specifically, when the screen 10 is longer than is wide, the correction information generation section 120 generates the correction information so that the projected image 12 after correction is formed in a region having an additional space at the top and bottom of the screen 10, as shown in FIG. 8B.

When the aspect ratio Sa is greater than 0.75, since A' is the point which divides E'F' at a ratio of m:n, A' equals (n*E'+m*F')/(m+n). Suppose that m+n equals 1.

Since the ratio of the height to the width of the screen 10 is Sa:1, it is required that m equals (Sa−3/4)/2 and n equals Sa−(Sa−3/4)/2 in order to maintain the aspect ratio of the projected image 12 after correction at 0.75. The correction information generation section 120 calculates B', C', and D' in the same manner as A'.

The correction information generation section 120 can thus generate second three-dimensional position information indicating the three-dimensional coordinates A'(A'x, A' y, A'z), B'(B'x, B'y, B'z), C'(C'x, C'y, C'z), and D'(D'x, D'y, D'z) of the four corners of the projected image 12 after correction based on the first three-dimensional position information, the height/width ratio of the screen 10, and the aspect ratio.

The correction information generation section 120 may generate the correction information so that the projected image 12 after correction is enlarged to some extent. This enables the appearance of the image to be improved as a frameless image. Suppose that the magnification factor is indicated by Ps, the origin is indicated by 0, and the intersecting point of the diagonals of the projection region after correction is indicated by P, the correction information generation section 120 may calculate the vertex A' of the projection region after enlargement as A'=Ps*PA'+OP. The correction information generation section 120 calculates B', C', and D' in the same manner as A'.

The correction information generation section 120 generates second two-dimensional position information indicating the coordinates IJKL of the four corners of the projection region 14 after correction on the virtual projection plane by perspectively projecting A'B'C'D' (second three-dimensional position information) in the three-dimensional coordinate system calculated as described above onto the virtual projection plane shown in FIG. 6.

Suppose that the coordinates of the four corners of the projection region 14 after correction are I(x0,Y0), J(X1,Y1), K(X2,Y2), and L(X3,Y3). In this case, X0=Pz*A'x/A'z and Y0=Pz*A'y/A'z for I. J, K, and L are calculated in the same manner as I.

Suppose that the coordinates of the four corners of the projection region before correction are A(x0, y0), B(x1, y1), C(x2, y2), and D(x3, y3). Since the projection region before correction coincides with the projection panel region 19, the coordinates of the four corners of the projection region before correction are known.

The correction information generation section 120 can generate the position correction information indicating the coordinates ABCD and IJKL in this manner.

The correction section 130 corrects the image information based on the position correction information from the correction information generation section 120 (step S4). In more detail, the correction section 130 may calculate transformation parameters for transforming the shape of the projected image 12 using the following transformation equations.

Figure 9:
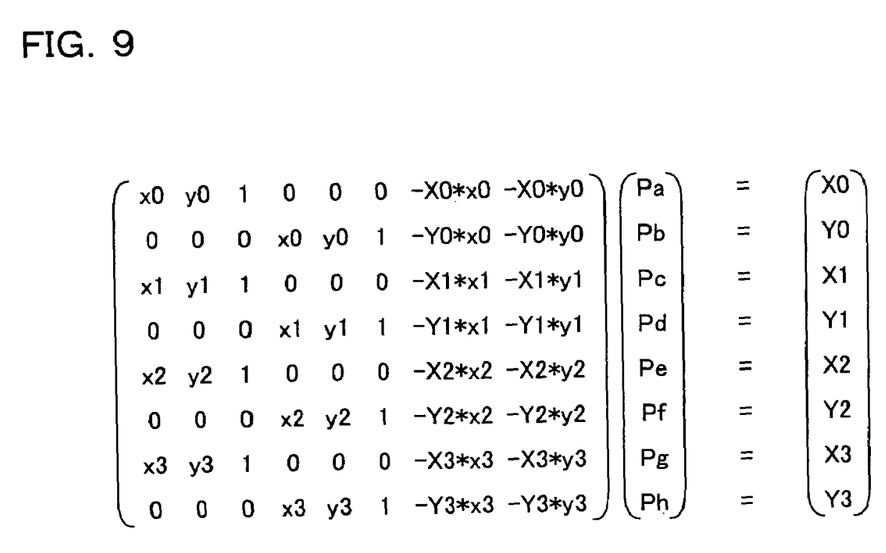
FIG. 9 shows an arithmetic expression for calculating transformation parameters according to one embodiment of the present invention.

FIG. 9 shows an arithmetic expression for calculating the transformation parameters according to one embodiment of the present invention.

The correction section 130 calculates eight transformation parameters Pa to Ph using the arithmetic expression shown in FIG. 9.

The correction section 130 corrects the coordinates of each pixel of the input image information using the following equations.

$$X=(Pa*x+Pb*y+Pc)/(Pg*x+Ph*y+1)$$

$$Y=(Pd*x+Pe*y+Pf)/(Pg*x+Ph*y+1)$$

(x, y) are coordinates of the pixel before correction, and (X,Y) are coordinates of the pixel after correction.

The image projection section 190 projects an image based on the image information corrected by the correction section 130 (step S5).

This enables the projector 20 to display the undistorted projected image 12 at the center of the screen 10 while effectively utilizing the screen 10.

As described above, according to these embodiments of the present invention, the projector 20 can project an image at a desired aspect ratio while effectively utilizing the region of the screen 10. This enables the projector 20 to project an image which is easily seen by an observer without being affected by the shape of the screen 10.

The projector 20 can determine the height/width ratio of the screen 10 based on the position adjustment information in a state in which the four corners of the projected image 12 coincide with the four corners of the screen 10. The projector 20 can correct distortion of an image so that the image is displayed at a desired aspect ratio by using the position adjustment information, the height/width ratio of the screen 10, and the like.

The projector 20 can correct distortion of an image without being limited to the vertical and horizontal distortion detection angles by utilizing the information on the four corners of the screen 10.

The projector 20 can correct distortion of an image so that the image is displayed at a desired aspect ratio corresponding to the horizontal angle of view of the projection lens 198 even when projecting the projected image 12 while increasing or reducing the size of the projected image 12.

The projector 20 can correct distortion of an image so that the image is displayed at a desired aspect ratio by specifying the positions of the four corners of the screen 10 in the three-dimensional space and utilizing the condition in which the opposite sides of the screen 10 are equal in length and are parallel.

In the above embodiments, since a CCD camera is not used, it suffices that the capacity of the memory provided to the projector 20 be small. Therefore, the projector 20 can be inexpensively formed in comparison with the case of using a CCD camera.

Modifications

The present invention is not limited to the above-described embodiments, and various modifications and variations are possible.

For example, the screen 10 is used as the projection target in the above embodiments, but the projection target may be a white board, a wall, or the like insofar as the projection target has a rectangular shape whose four corners can be detected.

In the above embodiments, the projector 20 uses the horizontal resolution and the horizontal angle of view, but the projector 20 may use the vertical resolution and the vertical angle of view as a modification. The horizontal resolution and the horizontal angle of view and the vertical resolution and the vertical angle of view may be used in combination.

In the above embodiments, the projector 20 is used as the image processing system, but the present invention is also effective for an image processing system for a display such as a cathode ray tube (CRT), light emitting diode (LED), or electroluminescence (EL) in addition to the projector 20.

As the projector 20, a liquid crystal projector, a projector using a digital micromirror device (DMD), or the like may be used. DMD is a trademark of Texas Instruments, Inc. (U.S.A.). The projection panel is not limited to the liquid crystal panel 920, and may be a DMD projection panel.

The above-described functions of the projector 20 may be implemented by only a projector, or may be distributed over a plurality of processing devices (distribution processing using a projector and a PC, for example).

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An image processing system, comprising:
   image projection means for projecting an image onto a rectangular projection target through a projection panel;
   position adjustment information generation means for generating position adjustment information based on position adjustment of the image made by a user;
   correction information generation means for generating position correction information for correcting positions of four corners of the image on the projection target based on the position adjustment information; and
   correction means for correcting image information for projecting the image based on the position correction information,
   wherein the correction information generation means calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

2. The image processing system as defined in claim 1,
   wherein the correction information generation means generates depth position information indicating a depth position for setting a virtual projection plane based on angle-of-view information indicating a horizontal or vertical angle of view of a projection lens in the image projection means and based on horizontal resolution or vertical resolution of the projection panel;
   wherein the correction information generation means sets a three-dimensional space in which an optical axis of the lens having a principal point of the lens as an origin is added to a two-dimensional plane of the projection panel as a third dimension;
   wherein the correction information generation means generates first three-dimensional position information indicating a position of the projection target in a state in which the projection target is perspectively projected onto the virtual projection plane in the three-dimensional space, based on the depth position information and first two-dimensional position information which indicates a position of the projection target on the two-dimensional plane based on the position adjustment information; and
   wherein the correction information generation means calculates the height/width ratio based on the first three-dimensional position information by utilizing a condition in which two opposite sides of the projection target are equal in length and are parallel.

3. The image processing system as defined in claim 2,
   wherein the correction information generation means generates second three-dimensional position information indicating a position of the image after correction in the three-dimensional space based on the first three-dimensional position information, the height/width ratio, and the aspect ratio;
   wherein the correction information generation means generates second two-dimensional position information indicating a position of the image after correction in a state in which the image is perspectively projected onto the virtual projection plane, based on the second three-dimensional position information; and wherein the correction information generation means generates the position correction information based on the second two-dimensional position information.

4. A projector comprising the image processing system as defined in claim 1.

5. A computer-readable information storage medium having a computer-executable program embedded thereon, the program including computer executable instructions, the program, when executed by a computer, causing the computer to function as:

image projection means for projecting an image onto a rectangular projection target through a projection panel;

position adjustment information generation means for generating position adjustment information based on position adjustment of the image made by a user;

correction information generation means for generating position correction information for correcting positions of four corners of the image on the projection target based on the position adjustment information; and correction means for correcting image information for projecting the image based on the position correction information, wherein the correction information generation means calculates a height/width ratio of the projection target based on the position adjustment information in a state in which the four corners of the image coincide with four corners of the projection target by the position adjustment of the image made by the user, and generates the position correction information based on the height/width ratio so that the image is displayed at a predetermined aspect ratio.

6. An image processing method, comprising:

projecting an image onto a rectangular projection target through a projection panel;

generating position adjustment information based on position adjustment of the image made by a user;

calculating a height/width ratio of the projection target based on the position adjustment information in a state in which the four corners of the image coincide with four corners of the projection target by the position adjustment of the image made by the user;

generating position correction information for correcting positions of four corners of the image on the projection target, based on the height/width ratio so that the image is displayed at a predetermined aspect ratio;

correcting image information for projecting the image based on the position correction information; and projecting the image based on the corrected image information.

7. The image processing method as defined in claim 6, further comprising:

generating depth position information indicating a depth position for setting a virtual projection plane based on angle-of-view information indicating a horizontal or vertical angle of view of a projection lens and based on horizontal resolution or vertical resolution of the projection panel;

setting a three-dimensional space in which an optical axis of the lens having a principal point of the lens as an origin is added to a two-dimensional plane of the projection panel as a third dimension;

generating first three-dimensional position information indicating a position of the projection target in a state in which the projection target is perspectively projected onto the virtual projection plane in the three-dimensional space, based on the depth position information and first two-dimensional position information which indicates a position of the projection target on the two-dimensional plane based o the position adjustment information; and calculating the height/width ratio based on the first three-dimensional position information by utilizing a condition in which two opposite sides of the projection target are equal in length and are parallel.

8. The image processing method as defined in claim 7, further comprising:

generating second three-dimensional position information indicating a position of the image after correction in the three-dimensional space based on the first three-dimensional position information, the height/width ratio, and the aspect ratio;

generating second two-dimensional position information indicating a position of the image after correction in a state in which the image is perspectively projected onto the virtual projection plane, based on the second three-dimensional position information; and generating the position correction information based on the second two-dimensional position information.

* * * * *